(12) United States Patent
Rajapakse

(10) Patent No.: US 8,239,559 B2
(45) Date of Patent: Aug. 7, 2012

(54) PROVISIONING AND STREAMING MEDIA TO WIRELESS SPEAKERS FROM FIXED AND MOBILE MEDIA SOURCES AND CLIENTS

(75) Inventor: Ravi Rajapakse, San Francisco, CA (US)

(73) Assignee: Blackfire Research Corp., San Francisco, CA (US)

( * ) Notice: Subject to any disclaimer, the term of this patent is extended or adjusted under 35 U.S.C. 154(b) by 1361 days.

(21) Appl. No.: 11/777,935

(22) Filed: Jul. 13, 2007

(65) Prior Publication Data

US 2008/0025535 A1   Jan. 31, 2008

Related U.S. Application Data

(60) Provisional application No. 60/767,555, filed on Jul. 15, 2006.

(51) Int. Cl.
*G06F 15/16* (2006.01)
(52) U.S. Cl. ........ 709/231; 709/229; 709/230; 709/248; 381/300; 381/311
(58) Field of Classification Search .................. 709/217, 709/229–231, 246, 248; 381/300, 311
See application file for complete search history.

(56) References Cited

U.S. PATENT DOCUMENTS

| | | | |
|---|---|---|---|
| 5,721,878 A | 2/1998 | Ottesen et al. | |
| 6,374,079 B1 | 4/2002 | Hsu | |
| 6,987,947 B2 * | 1/2006 | Richenstein et al. | 455/3.06 |
| 7,106,715 B1 | 9/2006 | Kelton et al. | |
| 7,669,113 B1 | 2/2010 | Moore et al. | |
| 7,870,272 B2 | 1/2011 | Berkowitz et al. | |
| 2002/0124097 A1 | 9/2002 | Isely et al. | |
| 2002/0169833 A1 | 11/2002 | Tani et al. | |
| 2004/0147282 A1 * | 7/2004 | Nakasato et al. | 455/552.1 |
| 2004/0193675 A1 * | 9/2004 | Fillebrown et al. | 709/203 |
| 2004/0223622 A1 * | 11/2004 | Lindemann et al. | 381/79 |
| 2006/0062401 A1 | 3/2006 | Neervoort et al. | |
| 2006/0149850 A1 | 7/2006 | Bowman | |
| 2007/0076908 A1 * | 4/2007 | Castaneda et al. | 381/311 |
| 2008/0242222 A1 * | 10/2008 | Bryce et al. | 455/3.06 |

FOREIGN PATENT DOCUMENTS

EP   1398931 A1   3/2004

OTHER PUBLICATIONS

International Search Report and Written Opinion for PCT/US 07/73620, Feb. 15, 2008, 8 pages.
Communication Pursuant to Article 94(3) EPC for European Patent Application No. 07717473.8, Dec. 14, 2011, 6 pages.
Supplemental European Search Report, European Patent Application No. EP 07717473, May 20, 2009, 7 Pages.
PCT International Search Report and Written Opinion, PCT/US07/61229, Feb. 14, 2008, 9 pages.

* cited by examiner

*Primary Examiner* — Mohamed Ibrahim
(74) *Attorney, Agent, or Firm* — Fenwick & West LLP

(57) ABSTRACT

Embodiments include system architectures and processes for handling the provisioning, management and control of media renderers. A plurality of media renderers are organized into a plurality of zones. Provisioning is performed dynamically as mobile media sources move between zones. Media renderers are dynamically detected, resources are allocated, and the system is configured for playback without noticeable interruption of the streaming and rendering of the media.

29 Claims, 7 Drawing Sheets

PROVISIONING AND STREAMING MEDIA TO WIRELESS SPEAKERS FROM FIXED AND MOBILE MEDIA SOURCES AND CLIENTS

CROSS-REFERENCE TO RELATED APPLICATION(S)

This application claims priority under 35 U.S.C. §119(e) to U.S. Provisional Patent Application Ser. No. 60/767,555, filed Jul. 15, 2006, entitled "Technique for streaming audio to wireless speakers, automatic provisioning of wireless speakers from a dynamic mobile media source and speaker design," the entire content of which is incorporated herein by reference.

BACKGROUND OF THE INVENTION

1. Field of the Invention

This invention relates generally to the field of data communications; and more specifically, to streaming media over a wireless network from fixed and mobile media sources.

2. Description of Related Art

As digital media devices become common place in the digital living room, there are a variety of protocols being defined with regard to how these devices interact with each other. However, these protocols are minimal in order to accommodate the most basic and general needs of digital media devices. For specific media device types however, there is a need to define additional methods and processes to optimize their use.

For example, for wireless speakers, the provisioning process is particularly complex when the wireless speakers have to be configured to work with mobile media sources and controllers. Because media sources may be mobile during the streaming of media to these wireless speakers, there is a need to prevent interruption of the streaming and rendering of media as the media source moves out of range of some speakers and into the range of others.

SUMMARY OF THE INVENTION

The present invention describes systems and methods to handle the provisioning, management and control of media renderers, such as wireless speakers. The system comprises a media source that streams media to media renderers. A plurality of media renderers are organized into a plurality of zones, wherein each media renderer belongs to one or more zones. The system performs provisioning dynamically as a control point and/or the media source enters a new zone. As a control point or media source moves to a new zone, media renderers are dynamically detected, resources are allocated, and the system is configured for playback on media renderers within the new zone without noticeable interruption of the streaming and rendering of the media.

In one embodiment, a zone manager aggregates information about the media renderers present in a zone. Thus, the speed of the system is increased by eliminating the need for a control point of the system to treat media renderers of a zone individually.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

1. General System and Devices

This invention describes architectures and methods to efficiently detect, configure and play media on a media system. Playing media on this system is a process of sourcing the media from a media source, sending it to one our more media destinations and playing the media on the destinations. The destination devices for this invention are speaker devices as described further below.

Figure 1:
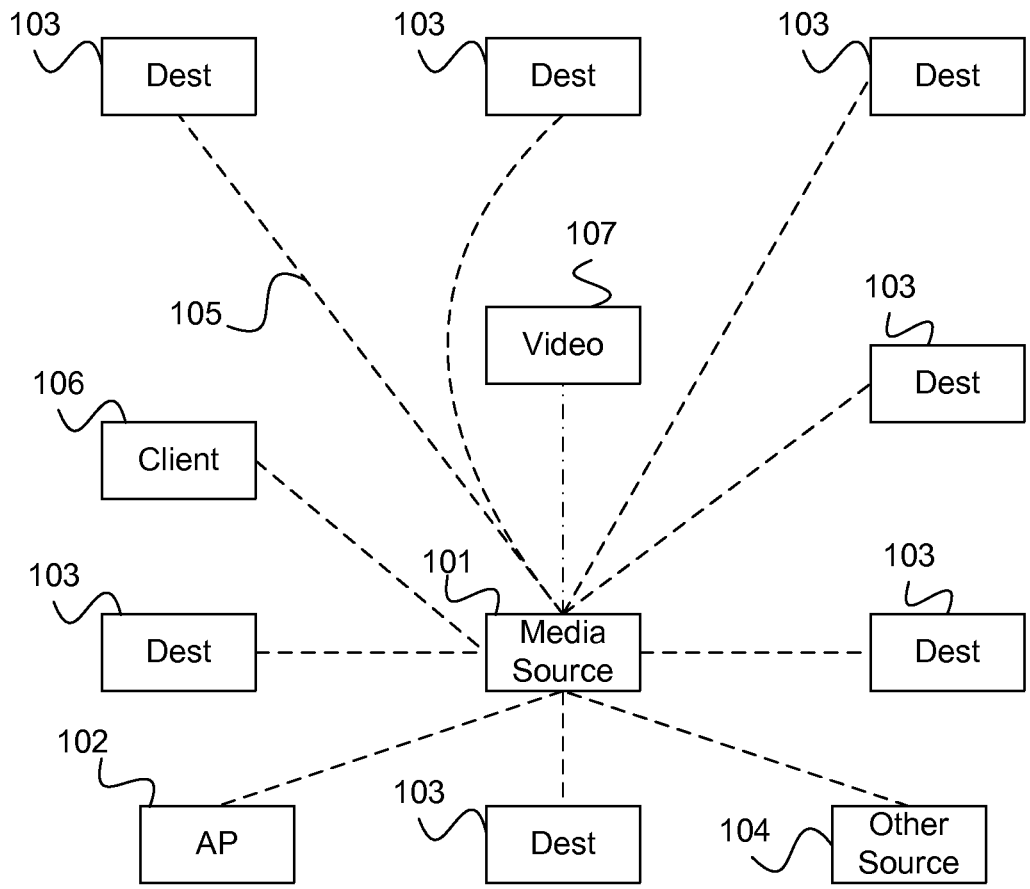
FIG. 1 illustrates an overview of the devices in a system in accordance with one embodiment.

FIG. 1 shows an overview of the devices in a typical system. The core of the system comprises a media source 101 that streams media and a number of destination devices 103 that consume the streamed media. The media used in this invention is audio data. The streaming of media is the process of sending the media as packets of data, in real time, from a source to a destination. The destination devices 103 consume the audio data they receive in real time and convert it to audible sound via speakers in real time. Each device type defined below applies to any device that plays that type of role.

1.1 Media Source Device 101

The media source 101 may be any computing device, including a PC, laptop, media center, PDA, MP3 player, music capable cell phone, cable set top box, satellite set top box or video game device. The audio data may come from files of a variety of common formats such as MP3, WMF, etc. Typically, for this invention, the media source 101 plays audio data via a media player application or streams audio data via a media server application to destination devices 103. These applications are defined further below.

1.2. Media Destination Device 103

In one embodiment, the destination devices 103 are wireless or wired Internet Protocol (IP) addressable speakers 103. These destination devices include a computing device (micro processor) and electronics that control one or more speakers. The speakers may be internal or external to the device.

Communications with these devices are performed over a network that conforms to an Internet Protocol Standard as defined by the Internet Engineering Task Force (IETF). The term "wireless" as used here includes any means to communicate with the speakers that does not use wires. Therefore, the term "wireless" here includes communication over RF, infrared, optical, or acoustic signals. The term "wired" here includes power line based methods, proprietary point to point means wires, as well as Ethernet of all flavors.

Audio data is streamed to the destinations via wired or wireless links 105. In this embodiment the wireless network is one that conforms to the Institute of Electrical and Electronics Engineers (IEEE) 802.11x or 802.15 standards. The links 105 are logical links that are depicted in FIG. 1 to show the movement of data, and the dotted lines of the links 105 do not represent actual physical connections. In a typical embodiment, the media source 101 will transmit to the destinations 103, with a Wireless Access Point 102 managing the wireless network in 'infrastructure mode'. Alternatively, the media source 101 may communicate with the destinations 103 in 'ad hoc mode' without a Wireless Access Point 102.

The multimedia system shown in FIG. 1 is a typical 7 channel surround sound system, with each destination device 103 representing one of the 7 channels: In the case of a typical surround sound multimedia system, these will be: front left, front center, front right, back left, back center, back right and subwoofer.

In addition to the primary media source 101, one or more other sources 104 may also be present on the network. These other audio sources may include analog audio sources that will stream the audio to the primary media source 101 for streaming to the destination devices 103.

A typical multimedia system may also have a video device 107 in addition to the other devices that allows the user to view graphic or video images. The video device 107 may also be driven by the media source 101.

1.3. Client Device 106

In some embodiments, the media source 101 may have a user interface through which the user interacts with the system to play media. In an alternate embodiment, a separate client device 106 may be present that provides the user interface to the user. The user interacts with the client device 106 that in turn causes media to be selected and served by the media source 101. The client device 106 may be any computing device, including a handheld computer, laptop, MP3 player, cell phone, PDA, or video game device.

2. Provisioning

The system shown in FIG. 1 describes a general multimedia system. In the case where some or all of these devices are wireless, these wireless devices may also be mobile. In this case, the setup and configuration process becomes more complex. Thus, the setup and configuration process is automated to some degree for the convenience of the user, in accordance with an embodiment of the invention.

For example, the media source 101 may be a handheld mobile wireless music player and the destination devices 103 may be wireless speakers in a user's living room. As the user enters the living room, it is desirable for the system to automatically detect the devices present and configure itself or provide the user with some simple choices for configuration. If an alternate user enters the same living room with another media source 101 and desires to play music to the same destination devices (wireless speakers) from the new media source, it is desirable that there be a means to detect and connect the new media source 101 to the destination devices 103. If the user and media source 101 move to the dining room that also has a set of destination devices 103 present, it is desirable for music playback from the media source 101 to transition to this new set of destination devices 103 automatically and without interruption.

The sections below describe methods and processes to accomplish this functionality.

3. System Devices

Figure 2:
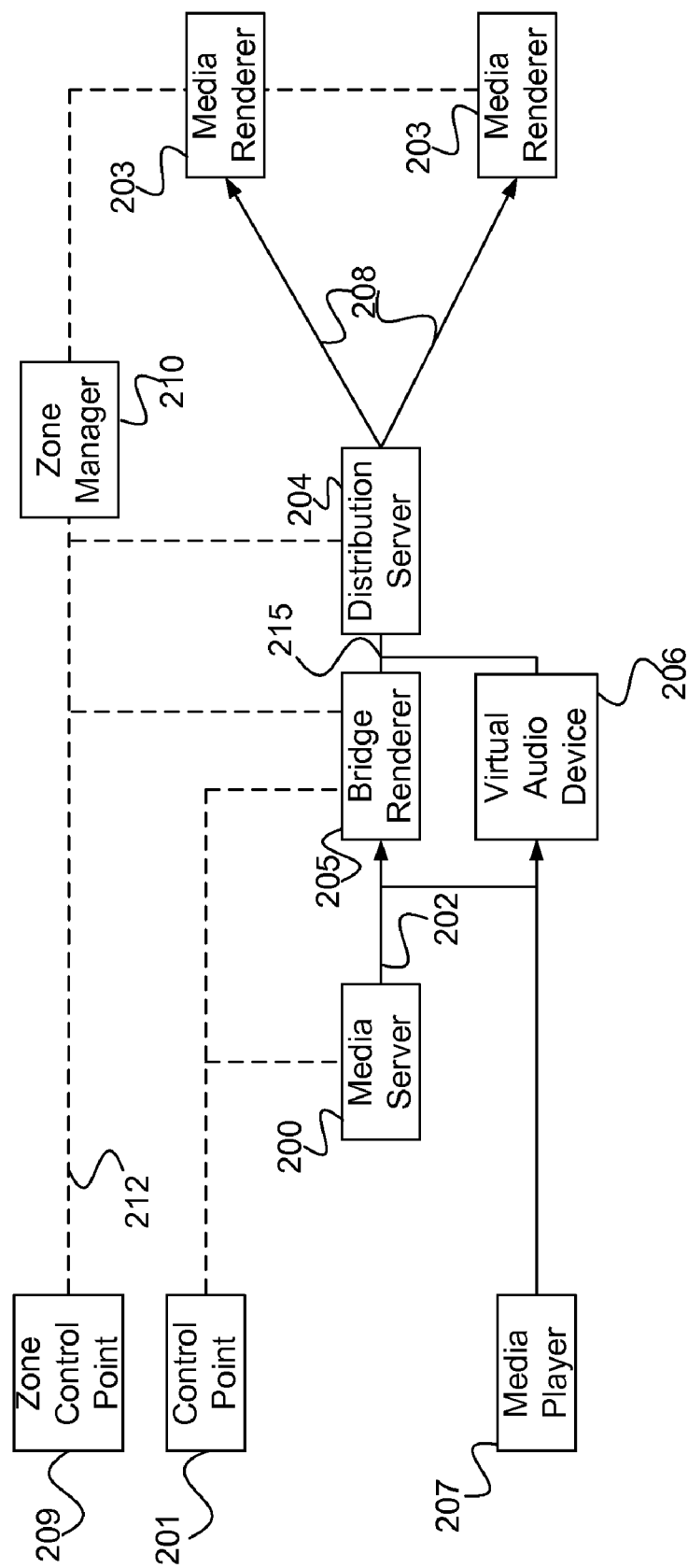
FIG. 2 illustrates the services in the system in accordance with one embodiment.

FIG. 2 illustrates the services in the system in accordance with one embodiment. All of these services are programs that run on a computing device. One or more of these services may run on the same computing device. Each computing device is one of those shown in FIG. 1. All services publish or make available for querying and setting various properties of that service and a service may make various actions available for initiation. For example, a media server service can publish the media that it has available and allow a control point to initiate a 'play' action for selected media. Each of the services defined below are generic labels for any software or software section that provides that type of service. In addition, these services may be combined into one or more programs and these programs may be application or operating system programs, including device drivers. In addition, in alternate embodiments the services referred to here may be combined with each other or other services in various combinations.

Each service is described below.

3.1. Media Server 200

The media server 200 is the source of a media stream. It can stream media to a media destination. The media that the server streams may be located local to the media service or may be located remotely on a network. The media server 200 may be any application or part of an application that can serve media for playback.

3.2. Media Renderer 203

A media renderer 203 is a media stream destination. It is an end point for a media stream that converts and presents, i.e., 'renders', the media stream it is receiving to a user in an audible or visible form depending on the media. The media renderer 203 is located on a destination device 103 shown in FIG. 1.

In the preferred embodiment of this invention, the media being streamed is audio data and the media renderer 203 renders audio data into physical form (sound). Therefore the device that the media renderer 203 runs on, the destination device 103, includes a speaker to render the sound.

Each media renderer 203 is set up with a variety of properties including lists of acceptable zone identifications, acceptable zone manager identifications, acceptable zone control point identifications, lists of acceptable stream identifications, rendition properties such as volume and role properties. These properties will be defined further below.

One of these properties, the 'role' of a media renderer 203, can define what stream channel the media renderer 203 will play back. Each audio data stream may include multiple channels, where each channel is defined as front left, center, front right, back left, back center, back right, subwoofer, etc. The media renderer 203 can be configured to accept one of the channels in the stream. If the stream does not contain the channel the media renderer 203 is configured for, it may be configured to play an alternate channel or not play anything. In addition to the channel type roles, a media renderer's role may include other 'roles.' A media renderer's role could be to play only deep base sounds, or to play only high pitch sounds in the media. As another example, a media renderer's role may be to provide special effects, such as echoes or background sounds. As a further example, a media renderer's role may be to play pre-recorded media segments at various points of the media stream. For example, a media renderer 203 may play pre-recorded media segments on initiation by a control point or zone manager, or based on sensing various states or conditions, such as powering up the media renderer, or detecting a sensor condition.

The rest of this description may on occasion refer to a 'speaker', which is the same as a destination device 103 in the context of 'devices' and a media renderer 203 in the context of 'services'.

3.3. Control Point 201

A control point 201 is able to query and set properties on other services and initiate action. The control point 201 may in addition have a user interface that allows a user to monitor and control actions in the system. For example, a user may through the control point 201, query for media servers 200, select a server and then query and select the media available on the selected media server. Then the user can query available media renderers 203, select an appropriate renderer and connect the selected server with the selected renderer. Then the user can initiate playback, the streaming of this media to the renderer. After the connection is made once, on subsequent use, the user only need select the media to be played.

3.4. Distribution Server 204

The distribution server 204 is a special type of media server that is able to transform an input media stream 215 into multiple streams and stream each stream 208 to a different media renderer 203 simultaneously. The distribution server 204 generates the output stream 208 in a format that the media renderers 203 understand.

3.5. Bridge Renderer 205

The bridge renderer 205 is a stream destination that accepts commonly available media stream formats and provides it to a distribution server 204 for streaming to media renderers 203. The bridge renderer may need to be enabled by a control point in order for it to become available for discovery by a control point that desires to connect a stream to it. A bridge renderer appears to the a media source and stream connected to it as a final point of rendition of the media stream. However, the bridge renderer does not render the stream into a physical form. Instead, the bridge renderer passes the stream to a distribution server.

3.6. Virtual Audio Device 206

The virtual audio device 206 is a device driver that provides the computing device that it is running on with a virtual audio device. This allows any application running on the computing device to play audio to this virtual audio device, and the virtual audio device will re-route this audio to the distribution server 204 for streaming to the media renderers 203.

3.7. Management of Zones 3.7.1 Zone

A zone is a physical space that a number of media renderers belong to and within which the media renderers are physically located. Typically a zone is a listening space, a space where the audio from all the media renderers in the space can be heard. For example, all media renderers within a single auditorium will be in the same zone. Zones may overlap and may include other zones. For example a campus with multiple auditoriums can have a campus zone with multiple auditorium zones within it. Each media renderer 203 is assigned to one or more zones. Zones are typically identified with a Zone Identifier (ZID).

3.7.2 Zone Manager 210

The zone manager 210 dynamically gathers and aggregates information on the media renderers 203 in its vicinity and makes this information available to other services.

Media renderers 203 in the vicinity of a zone manager 210 are media renderers 203 that are in communication range of the zone manager. When the communication links are wireless the zone manager is typically located in physical proximity to the media renderers in the zone. For wired links this range may be limited by network devices such as routers that may restrict communication to some of the media renderers on the network. For example, different sets of media renderers in different zones may be placed on different sub networks, thus limiting communication range to only those devices on the same sub network.

In addition to gathering media renderer information, the zone manager 210 holds information specific to a zone, manages the media renderers 203 in the zone, and may provide additional services and actions, such as media renderer reservation to other services such as control points 201.

For certain configurations described below, it is necessary for the zone manager 210 to be in close proximity to the media renderers 203 in the zone. The zone manager service may actually be running on one of the destination devices 103 that has a media renderer 203 in the zone. The destination device 103B in FIG. 3 includes a zone manager in addition to a media renderer 203.

3.8. Zone Control Point 209

The zone control point 209 is an enhanced version of a standard control point 201. The enhancements allow the zone control point 209 to interact with the zone manager 210 to quickly gather information on sets of media renderers 203 in a zone and perform actions on the zone.

In some parts of this document, a zone control point may also be referred to as a "control point" for convenience. In these cases, if the implied functionality is that of a zone control point, the term "control point" is intended to refer to a zone control point.

3.9 Media Player 207

The media player 207 is any application program that plays media to an audio device on the computing device on which it is running. The media player application may be a music player, a movie player, a video game, internet radio or any other type of application that plays audio. This includes music and movie players such as Windows Media Player (Windows Media Player is a trademark of Microsoft Corporation) that receives its media from a DVD or stored media, internet applications such as the Rhapsody™ music player (Rhapsody is a trademark of Real Networks, Inc.) or iTunes™ player (iTunes is a trademark of Apple, Inc.) that receives its media via the Internet. In one example, the media player 207 is a video game application running on any video game machine or PC. Similarly, the software running on a cell phone, MP3 player or PDA may also be a media player 207 if it can play audio to a local audio device.

If a virtual audio device 206 is present on the computing platform, the media being played by the media player 207 will be routed to the media renderers 203 via a distribution server 204.

If the media player allows functional extensions, such as in the form of embedded applets, these applets can be designed to provide zone control point functionality and thus allow the media player 207 to have zone control point functionality, if it is not already built in. So for example, zone information may be displayed and managed from within the media player 207.

4. Provisioning Process Overview

Figure 6:
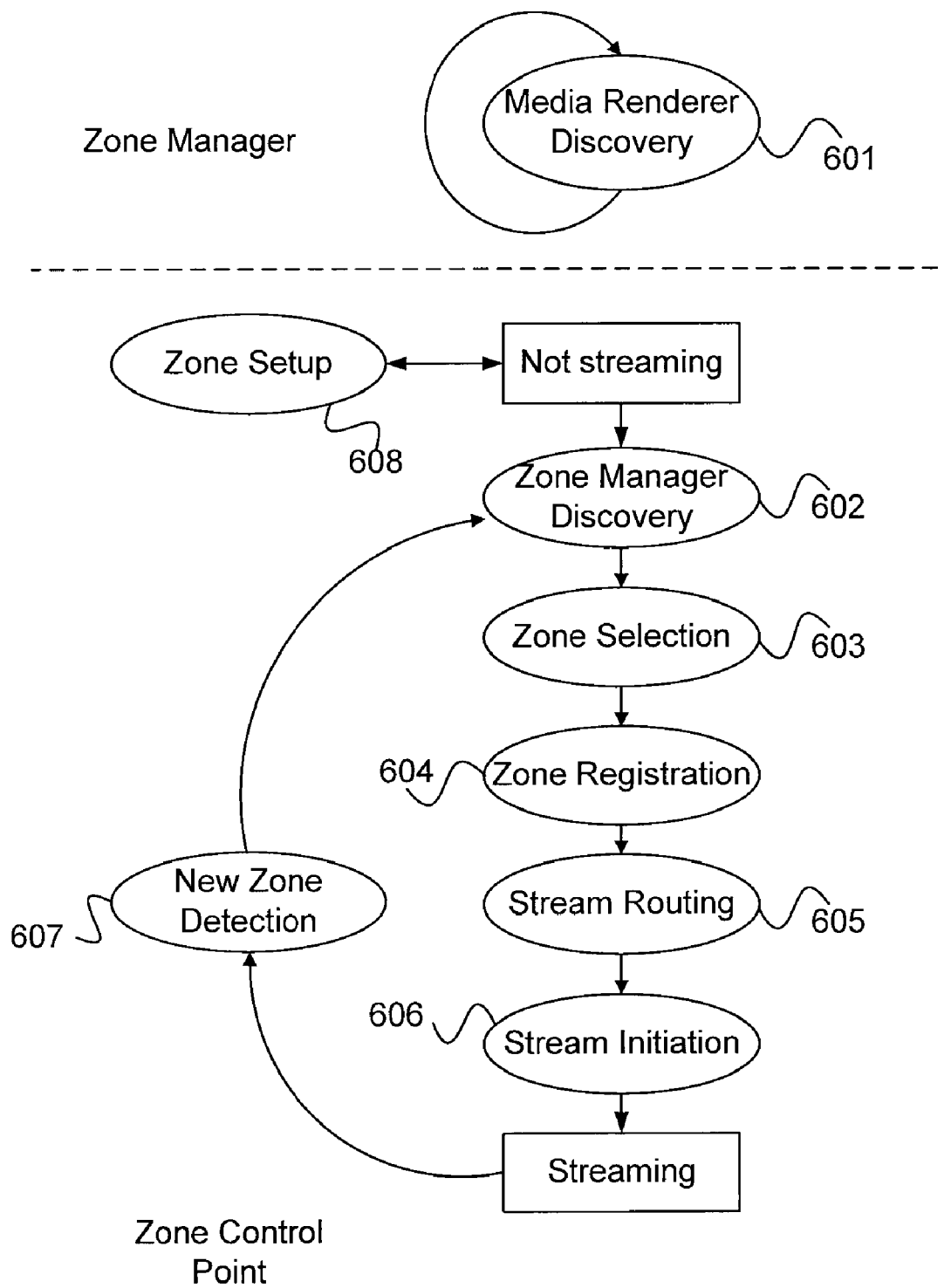
FIG. 6 illustrates a method for provisioning a system in accordance with one embodiment.

FIG. 6 illustrates a method for provisioning a system in accordance with one embodiment. A brief overview of the steps is as follows:

- Media Renderer Discovery 601—zone managers 210 discover media renderers 203.
- Zone Manager Discovery 602—zone control points 209 discover zone managers 210 and therefore sets of media renderers 203 that are available.
- Zone Selection 603—a zone control point 209 selects a zone and therefore a set of media renderers 203.
- Zone Registration 604—reserve media renderers 203 for use.
- Stream Routing 605—connect stream path from media server 200 to media renderer 203.
- Stream Initiation 606—playback.
- New Zone Detection 607—detect a new zone if current zone falls out of range.
- Zone Setup 608—configure zone and media renderers 203.

Overall, the zone control point 209 discovers and sets up the back end of the system, (bridge renderer 205, distribution server 204, media renderer 203) via the zone manager 210. A zone control point 209 or standard control point 201 can then discover and set up the front end of the system (media server 200 and bridge renderer 205) for streaming the media.

Having the zone control point 209 work through a zone manager 210, limits network traffic and reduces setup time by not requiring the zone control point 209 to interact with each of the many media renderers 203 individually. In a dynamic environment, where the zone control point 209 may be on a moving mobile device, this becomes very important for rapid provisioning.

These processes are detailed further below:

4.1 Media Renderer Discovery 601

The zone manager 210 continuously maintains a list of media renderers 203 in its vicinity. It does this by broadcasting an 'identify yourself' instruction periodically. All media renderers 203 that receive this instruction will respond back to the zone manager 210 with an 'identify response' instruction that includes its identity, current state, and limited configuration information. The identity information includes the media renderer's identifier, its set of assigned zone identifiers (ZIDs), and its role within each zone, and known default stream identifiers for each zone. The current state information includes its current playing state: playing or idle. The media renderers 203 are also configured with a list of acceptable source identifiers, which may be alternatively be set for accepting any source identifier.

In addition, the zone manager 210 keeps track of the signal strength of communications from each media renderer 203. This information can be used by a zone control point 209 for selecting a zone. For example, if the signal strength of communications from a media renderer 203 is below a threshold, In this design, the zone manager 210 simply broadcasts an identify command and each media renderer 203 present responds with a basic set of information. The benefit of this scheme is that it allows for very dynamic environments where a time consuming discovery process will be limiting. Instead, this simple challenge and response scheme allows a quick initial detection of what media renderers 203 are present and their state. In one embodiment, this challenge may be performed as frequently, for example, as once every second, and thus needs to be efficient.

Typically the zone manager 210 will only issue the identify broadcasts when it is active, but unregistered to a set of media renderers 203. A benefit of having the zone manager 210 broadcast identify commands is that it limits the amount of traffic on the air, when the number of unregistered zone control points 209 is small compared to the number of media renderers 203 present in a region.

4.2 Zone Manager Discovery 602

The zone control point 209 detects and interacts with the zone manager 210 via a zone control protocol 212. There may be multiple zone managers 210 present in an area. The zone control point 209 will probe for and select a zone manager 210 to use based on any one of a number of preset criteria or it may prompt the user to choose or it may auto select based on a communication property such as the signal strength of communications with the zone manager 210. The zone manager 210 informs the zone control point 209 of what zones have been detected and are available for use. For a zone to be available for use, the ZID must have been received from a media renderer 203 in response to zone manager identify messages.

4.3 Zone Selection 603

After zone manager discovery 602, the zone control point 209 retrieves zone information from each zone manager 210 and the zone control point 209 then uses this information to select a zone from the available set of zones. This selection may be an auto selection from the available zones (ZIDs) based on some preset criteria, such as signal strength, or based on user selection. The available zones may also be a criterion for selecting the zone manager in the first place.

4.3.1 Media Server Access

Once a zone control point 209 discovers a zone it could use, the zone information may include notification of what media categories are allowed for playback on this zone. If the acceptable media categories are limited, the system will only allow media streams from a source of media that fits within these categories. The zone information may also provide access to a media server 200 with content on it that the source 101 can use for playing to the zone media renderers 203. Accessing the zone media information may require further authentication and authorization.

If so, the zone control point 209 will be directed to a media server authorization service point to do this. This service may demand additional information that the source may provide automatically or require user prompting and action.

This process allows the user and zone control point 209 to get information on the zone, view media available to play on the zone and then make a selection.

4.4 Zone Registration 604

Figure 7:
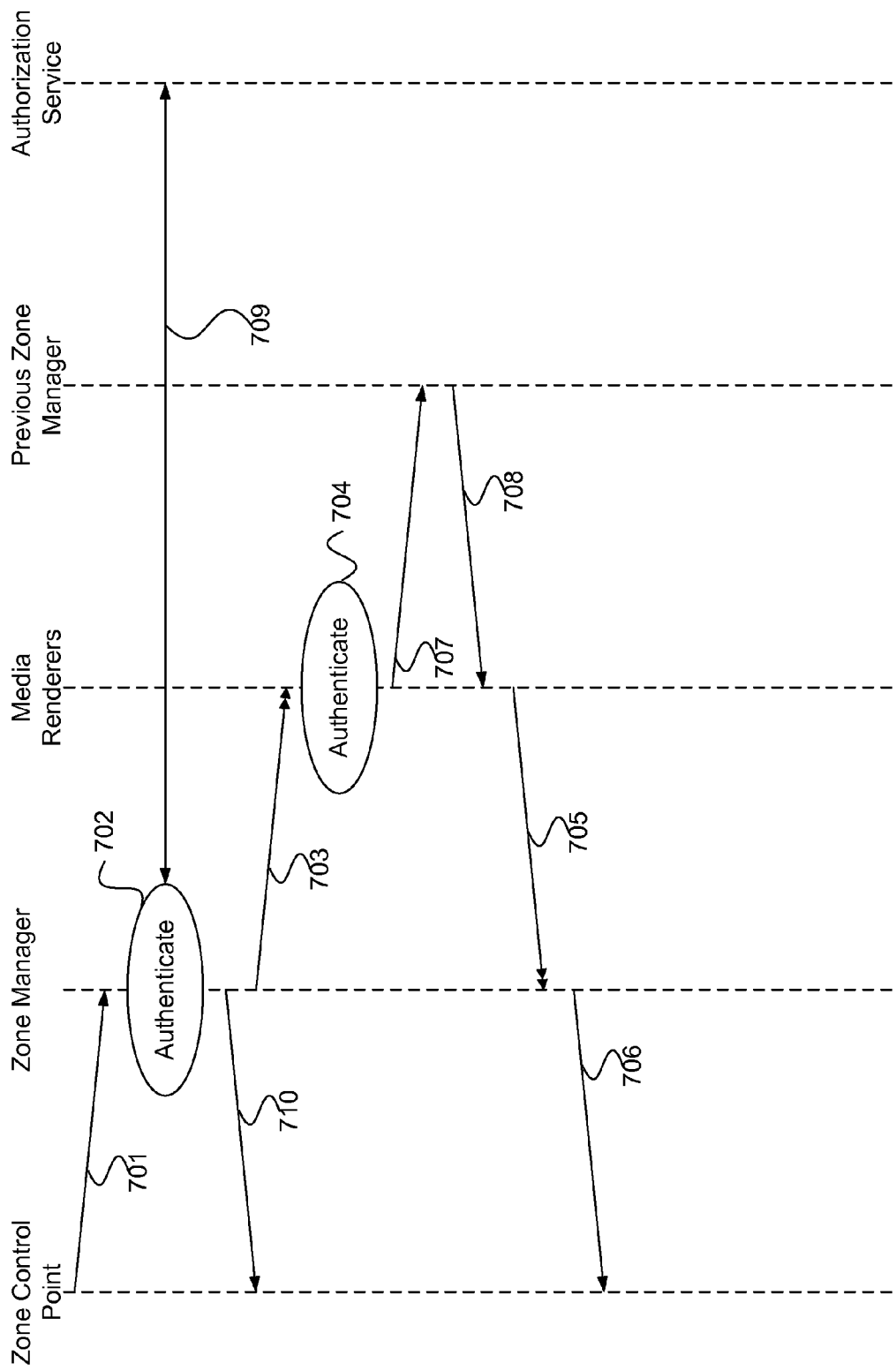
FIG. 7 illustrates a method of zone registration in accordance with one embodiment.

Before any streaming can be done zone registration 604 takes place. FIG. 7 shows some of the steps for zone registration 604. The purpose of the zone registration 604 process is to reserve a set of media renderers 203, defined by being in a zone, for exclusive use by that zone control point 209. If a new zone control point 209 requests the zone, the previous zone control point 209 can release the reservation.

The zone registration 604 process consists of two parts, media renderer registration (MRR)—the registration of the media renderers 203 with a zone identifier (ZID) and zone control point registration (ZCPR)—the registration of the zone control point 209 with the zone identifier (ZID). Both parts are managed by the zone manager 210.

When a zone control point 209 has selected a ZID to use, it asks the zone manager 210 to register the zone control point 209 for use of that ZID 701. The zone manager authenticates 702 and validates the zone control point 209 and ZID selection and if valid it then performs a media renderer registration 703 for that ZID, if media renderer registration for that ZID has not already been performed. If the zone manager 210 has already registered media renderers 203 for that ZID, it reserves the zone for the user by the requesting zone control point 209 and responds back 710 to the zone control point, notifying it of registration success.

4.4.1 Media Renderer Registration

Media renderer registration starts with the zone manager 210 broadcasting a register command 703 to the media renderers 203. This command includes a zone manager ID and an authentication key. Each media renderer 203 first authenticates 704 the register command and then either responds 705 with an accept or reject registration message. In one implementation, if one or more media renderers 203 in a zone reject the registration request 703, the zone manager 210 tries registering up to three more tries. If all of these fail, the zone manager 210 may notify 706 the zone control point of a zone registration failure and the zone control point 209 may give the user the option to select another zone, or change the authentication information.

If a media renderer 203 is already registered with another zone manager when the registration request comes in, and the registration request passes authentication, before responding, the media renderer 203 will notify 707 its current zone manager of the registration request from the new zone manager and ask for permission to deregister. If the current zone manager does not respond to this deregistration request within a timeout period, the media renderer 203 will assume approval and accept the new registration request from the new zone manager.

If the old zone manager responds 708 by rejecting the deregistration request, the media renderer 203 will decline the new registration request by sending back a reject registration response 705 to the new zone manager. When the reject registration response is sent, it includes information on whether the registration was declined because of an authentication failure, or an existing registration. The zone manager 210 will provide this information to the zone control point 209 that may provide this information to a user. The user may choose to update the authentication information or to send a force registration request.

4.4.2 Force Registration:

The user may, via the zone control point 209, cause the zone manager 210 to send a force registration 703 request to a media renderer. The force registration request includes an authentication key and an admin authentication key. The media renderer will use the authentication key and if that fails, the admin authentication key to authenticate the force registration request. If the authentication passes, the media renderer will stop anything it is doing and accept the registration 705. If the media renderer was already registered to a previous zone manager, it will notify 707 that previous zone manager of a deregistration due to a force registration request.

4.4.3 Zone Control Point Registration

Once media renderer registration is successful, the zone manager responds 706 to the zone control point 209, the zone control point registration (ZCPR) completes and the zone manager registers the zone control point as using that particular ZID. It is then unavailable for any other control point to use, until it is released with a control point deregistration. If any of the registration steps have been already performed, they are not repeated.

4.4.4 Registration Authentication

The authentication step 704 during media renderer registration first starts with pre authentication where the zone manager identifier is compared with the media renderer's list of acceptable zone manager identifiers. If there is no match, the authentication fails. If there is a match or the acceptable zone manager identifier is set to accept any zone manager identifier, then the next step of authentication takes place. In this step the public authentication key given by the zone manager 210, together with the media renderer's 203 private key is processed through an authentication algorithm. This algorithm indicates success or failure, depending on whether the given public key was acceptable.

While there are a variety of authentication schemes, in this embodiment, a public and private key scheme is used. The zone manager 210 is provided with the public key and the media renderer 203 is configured with the private key.

The admin private key can be set via switches, a serial link or wirelessly. If set wirelessly it needs the old private admin key in order to set the new private admin key. The implementation may provide for a reset button that resets the admin key to a default, factory set Admin key.

The public and private keys may be implemented in a variety of forms and may be as simple as codes or strings. The algorithm that authenticates the two keys may use one of a variety of techniques familiar to those of skill in the art, and therefore not described here.

4.4.5 Registration Request Validation

When a zone manager 210 receives a registration request 701 from a zone control point 209, it may forward this request 709 to a registration request authorization service point. This authorization service may be located anywhere on the network. This authorization service may use the registration request information to first authenticate the identity of the registration requestor. As part of the authorization process, the service may request and receive additional information over the IP network from the registration requestor. It may then approve the request or it may require a charge for this transaction if configured to do so.

For example, the service may charge the registration requester a dollar for each registration and may instruct the zone manager to drop the registration after one song. Alternatively, the charge may be for a limited period of time. Both of these can be performed by notifying the zone manager of approval of the registration based on a condition, such as one stream or a time period. Executing the transaction charge may involve further transactions with the source making the registration request as well as transactions with a financial service such as a phone billing system or a credit card service. The authorization service point may also be configured to authorize the content to be played. In this case the registration request may include content information or the service will request additional content information and validate this against an authorized set of content.

4.5 Stream Routing 605

Connection

The normal process for media streaming is for a control point 201 to first query all services and discover all services present and then for it to connect a media server 200 with media renderers 203 that have compatible properties. After connection and user selection of the media to be played, the control point 201 asks the media server 200 to stream this media to the media renderers 203.

However, in some implementations of this wireless speaker based media system, the media server 200 may not be compatible with the wireless speaker media renderers 203. Furthermore, a standard control point 201 may not know how to configure all the information that the media renderers 203 need to operate.

Therefore, the services, zone control point 209, bridge renderer 205 and distribution server 204, are designed to together enable a standard media server 200 and standard control point 201 to work with the (wireless speaker type) media renderers, by connecting the stream from the media server 200 through these services to get to the media renderers 203.

The first step in the stream routing 605 process is for the bridge renderer 205 to be enabled for discovery. This is done by a zone control point 209 after it has selected and successfully registered a zone with the zone manager 210.

The bridge renderer 205, once enabled, presents a standard media renderer to a standard media server 200 and control point 201. By standard media renderer, what is meant is that the bridge renderer 205 accepts streaming media from media servers 200 using widely available and common streaming formats.

The zone control point 209 then asks the media server 200 to connect to the bridge renderer 205 and asks the distribution server 204 to connect to the media renderers 203 for the ZID it has gained access to via the zone manager 210.

Once connection is established, the zone control point 209 can manage the streaming. When streaming is done, the zone control point releases its resources by deregistering the ZID with the zone manager 210. The zone then becomes available for use by another zone control point 209.

4.6 Stream Initiation 606

Playback

Once the connections are established in the stream routing process 605, the zone control point 209 then allows the user to select media from the media server 200 for streaming through this connection.

As part of the process of stream initiation 606, the media source 101 may include a 'start stream' notification prior to sending the stream. The start stream notification may include information on the stream to be sent and may include such things as information on the source device 101, and the stream content information such as title and artist information. The media renderer 203 may be configured to display this information if it has a means to display such information.

The zone control point 209 may also display information to the user on the zone it is playing to, information on the media renderers 203 in the zone and information on the stream it is playing such as what track it is from and the track title and artist. It may also show what play list the track is from.

The rendition of each stream by a media renderer 203 (speaker) needs to be synchronized in time. This is enabled by the distribution server 204 working with the media renderer 203, using a stream protocol specific to the media renderers 203. This protocol includes the methods to time-synchronize rendition of the stream.

The rendition of the stream by the media renderer 203 is done according to the properties that have been set up for the media renderer 203. For example, the media renderer 203 that has been set up as the 'left front center' role, will only play the part of the stream that is for a 'left front center' device. If multiple streams are being received, it will only render streams with stream identifiers for which it has been configured.

4.7 New Zone Detection 607

When automatic new zone detection is enabled, each zone control point 209 on the source is periodically sending out a zone manager detection command, even while already registered with a zone and streaming is taking place. For each zone manager that responds, the zone control point will collect zone information provided by the zone manager 210, including information regarding signal strength of communications between the zone manager and each media renderer. In addition the zone control point 209 keeps track of signal strength of communications with the zone manager 210 and between the distribution server 204 and each media renderer 203. The zone control point 209 will then use this information to determine which zone is the closest and/or best to use. If this zone is different from the zone the zone control point 209 it is currently connected to, it will pause the stream, disconnect the current stream path, deregister the zone, register to the new zone and initiate connection to this new zone. It will then resume playing the stream to this new zone. If the new registration request fails, it will attempt registration to the next strongest zone until it has no zones to register to, at which point it will stop streaming.

The speed of transitions from zone to zone is determined by the time it takes to deregister/register and disconnect and accept new connections and determines the length of time for which the music stream is paused. The zone control point will perform these zone transition steps prior to going out of range of the current zone and will transfer the streaming to the new zone with minimal interruption of the streaming and the rendition of the media. Key to being able to do this zone transition in a timely manner is selecting a set of media renderers 203 to work with via the zone mechanism, rather than working with individual media renderers 203 directly.

Automatic transitions to new zones will only take place to zones that are in the zone control point's acceptable zone identifier list and the media renderer's acceptable zone control point identifier list, and zones that have successfully completed authentication. This ensures that the stream is not played on unintended speakers.

4.8 Zone Setup 608

Once a zone manager 210 registers a media renderer 203, the zone manager 210 may view and modify the media renderer's setup by interacting with a user directly or via a control point 201. This includes modifying the media renderer's zone list, default stream list, role, and properties such as volume. The media renderer's authentication keys can only be changed after doing a force registration that requires the admin authentication key and is done according to the description in the authentication section.

4.8.1 Remote Control Setup

Media renderers 203 may also receive setup commands from directional, limited range, devices such as an infrared remote control. A media renderer 203 with this capability will respond to commands, such as a command to increase or decrease that media renderer's volume level. The media renderer 203 can be configured to not require authentication or authorization in order to act on a specific set of commands.

This would allow any remote to adjust the media renderer's volume without a lot of communication overhead.

Commands from a remote control may be passed on to the zone manager 210 to modify properties at the zone manager 210, and may further cause actions at a zone control point 209 if a zone control point 209 is registered.

In addition, both a registered zone control point 209 and/or zone manager 210 may respond to a remote control command with a message to the remote control.

In an alternative embodiment, a zone manager 210 with a user interface may reside on a remote device that acts as a remote control. This would allow the user to modify zone and media renderer properties through this zone manager 210.

4.9 Service Issues

4.9.1 Multiple Control Points

Any number of zone control points 209 may be present and causing music streaming to media renderers 203 at once. Each zone control point 209 will be streaming to a distinct set of media renderers 203 in a zone. If two zone control points 209 want to stream to the same media renderers 203, the last zone control point to register and initiate a connection to those media renderers 203 will gain control and start streaming, unless the previously active zone control point 209 and zone manager 210 rejects the registration request.

4.9.2 Multiple Zone Managers

There may be multiple zone managers 210 active in a particular area that may negotiate registration and use of media renderers 203 from time to time. Also, there will be at least one zone manager located on the network for each physical listening zone and this zone manager may be located on one of the media renderers present in the zone.

Zone managers 210 may also be present on other devices such as a mobile handheld device and are able to register and control media renderers 203 if authenticated. This is useful, for example, for configuring media renderers 203.

4.9.3 Multiple Streams

There may be multiple streams of audio being sent to multiple media renderers 203 in multiple zones at the same time. In one embodiment, each media renderer 203 will only play content from a stream coming from a source 101 it is connected with and has authenticated.

In one embodiment, each stream that is sent to a media renderer 203 has a stream identifier. Each media renderer 203 may be configured with a set of default stream identifiers. For each of these default streams, the media renderer 203 will have configuration information including the role it is to play, the acceptable source identifiers and other configuration info. This means that a media renderer 203 may play multiple roles for different streams without any additional configuration steps when switching streams.

As an example, a media renderer may be the front left channel when a movie is being played to a screen that is centered between it and the front right. This would be configured as default movie stream. This same media renderer may be configured also to be the back left channel when playing a default HiFi audio stream, where hi performance front media renderers are positioned elsewhere in the room. In this case the speaker is pre-configured to play a default movie or HiFi stream and plays the appropriate role depending on the stream identifier. In this case, when the media source is playing a movie, it plays with the movie stream identifier and when the media source is playing HiFi music, the stream identifier represents the HiFi stream.

4.9.4 Alternative or Supplemental Identification

The media renderers 203 may be configured to periodically broadcast a notify identification message over the wireless media. This message may contain all or most of the information in the identify response message described above. If a zone manager 210 receives a notify identification message, it will not perform any identify broadcasts of its own. Instead it will listen for a configurable period of time and collect as many identification messages from as many media renderers 203 as it can receive in its vicinity. It will then select a zone and register to a set of these media renderers based on a similar technique as described above, after receiving responses to an identify command it broadcast. If there is inadequate notify identification messages the zone manager 210 may choose to start broadcasting identify commands again.

This mechanism allows the media renderers 203 to spontaneously perform identity broadcasts rather than having the zone manager 210 ask for them. Secondly it is a means to automatically inhibit multiple zone managers 210 from broadcasting identify commands. This is beneficial for an environment where there are potentially many more zone manager 210 than there are speakers.

4.9.5 Client Software Installation

A service download web site may be used to download the services described above to devices in the system. Any client device, such as a cell phone or PDA, may therefore be enabled to work with this media system, by simply downloading the services and installing them as instructed.

4.9.6 Operation without a Zone Manager

In an alternate embodiment, it is possible to have a system without a distinct zone manager. In this case, a zone control point will include some if not all of the zone manager functionality and any reference to a zone manager can be considered to apply to the zone manager functionality internal to the zone control point. For example, this means the 'zone control point' will discover media renderers in its vicinity rather than discovering zone managers. Also it is possible to have the media renderers in no specific zone, which can be considered as equivalent to the media renderers being in zone 0 or a default zone.

5. Typical Configurations

Figure 3:
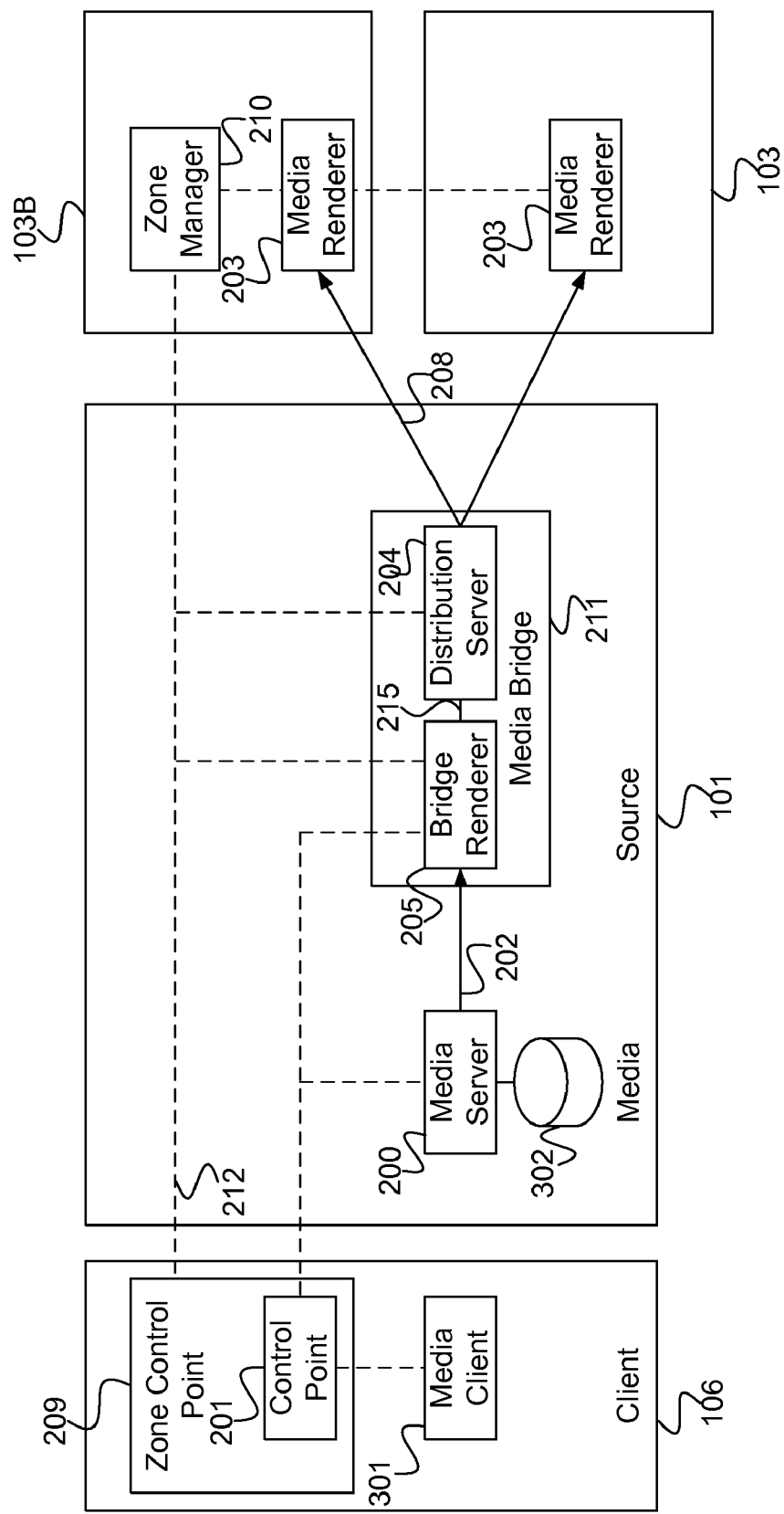
FIG. 3 illustrates a system configuration for media playback on a remote device in accordance with one embodiment.
Figure 4:
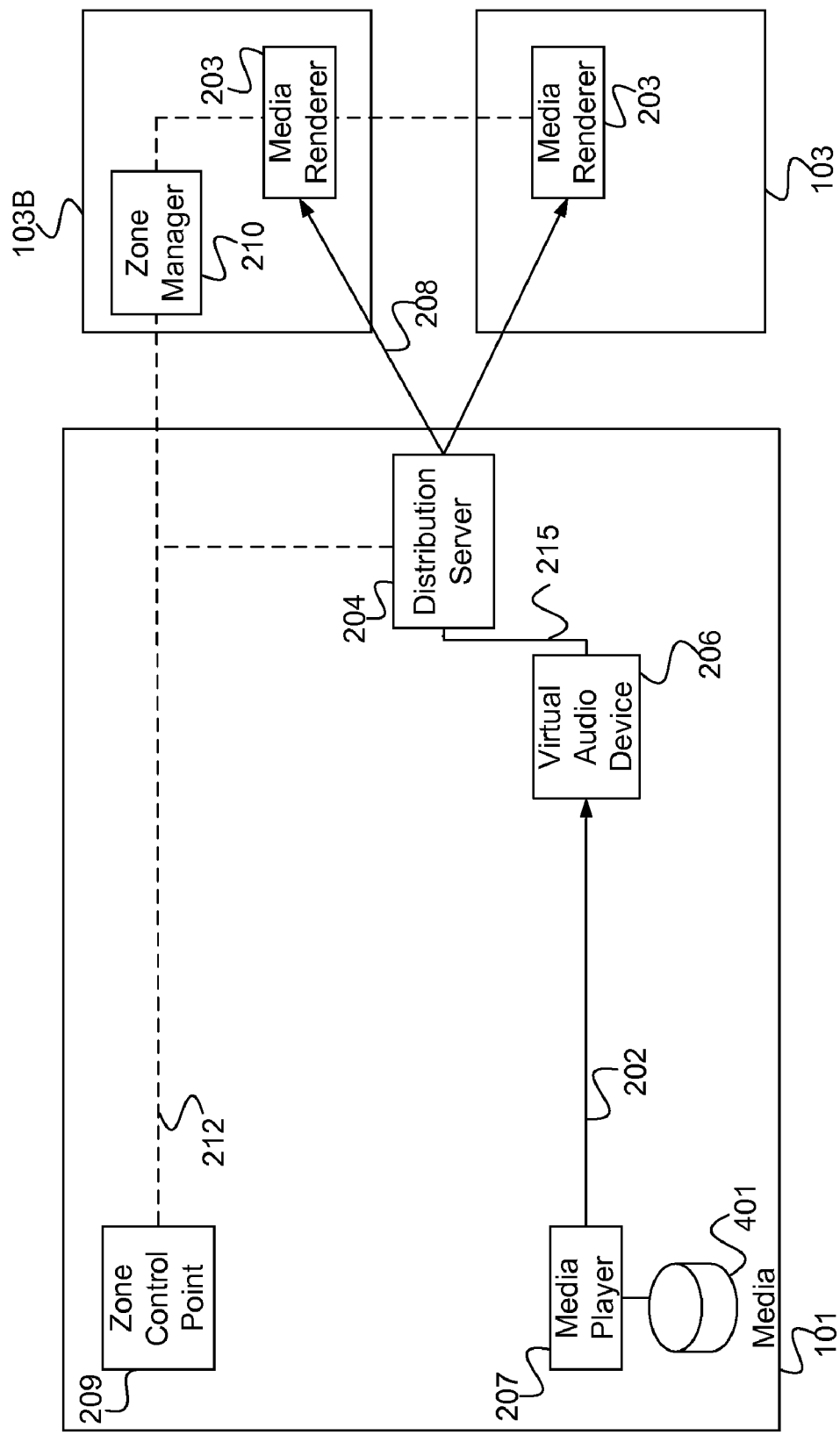
FIG. 4 illustrates a system configuration for media playback on a local device in accordance with one embodiment.
Figure 5:
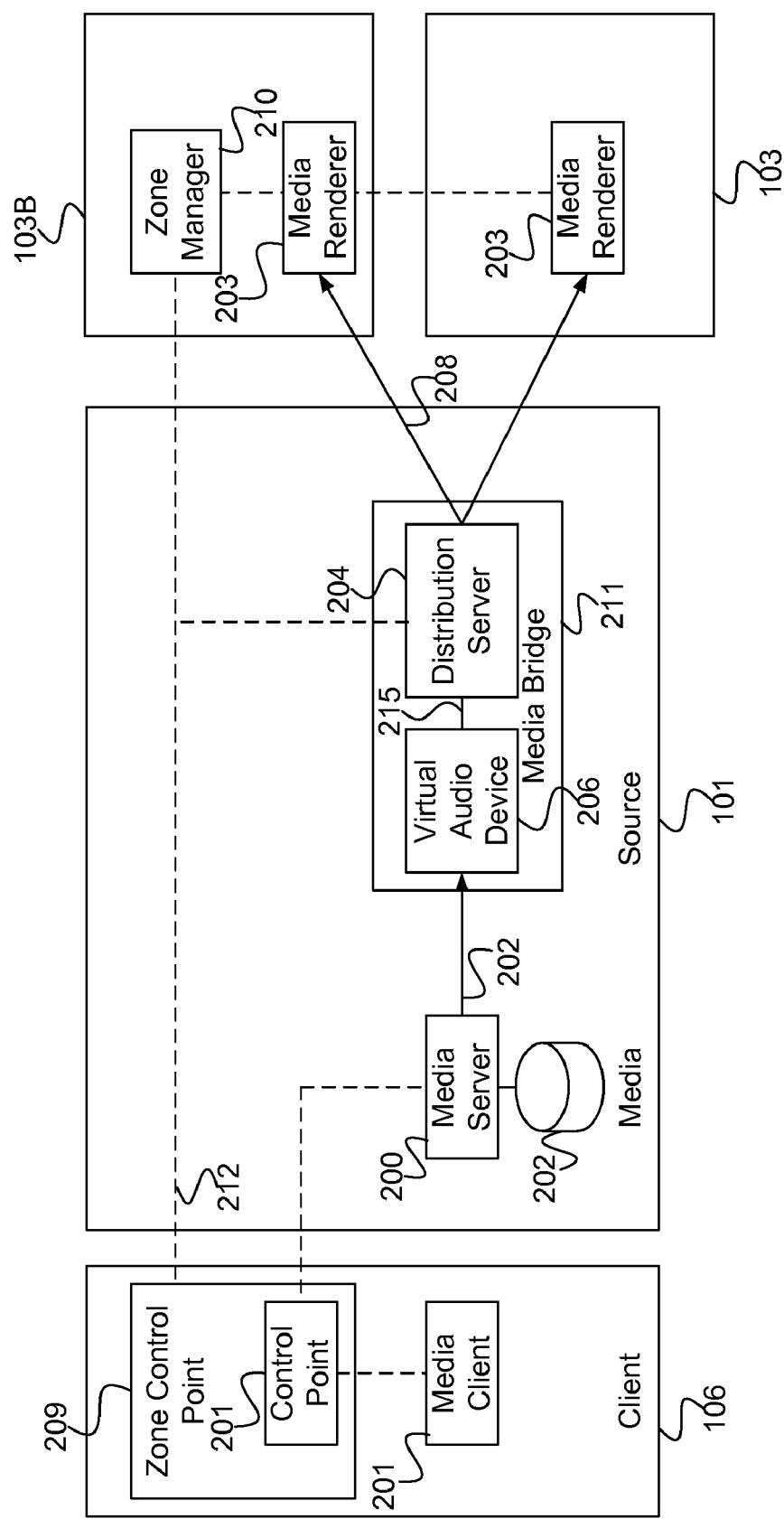
FIG. 5 illustrates another system configuration for media playback on a local device in accordance with one embodiment.

The services in FIG. 2 may be combined in a number of typical configurations to create practical media system. These combinations are essentially different allocation of the 'services' in FIG. 2, to 'devices' in FIG. 1. FIGS. 3-5 show three typical configurations.

5.1 Remote Source to Bridge Renderer (RSBR)

Media Playback on a Remote Device

FIG. 3 illustrates a system configuration for media playback on a remote device. In this configuration, the media is played (streamed) from a source device 101 that is remote from the user. In this configuration, the user has a handheld client device 106 that contains a media client application 301 and may include a control point 201 located at the handheld client device 106. The client device 106 in this configuration can be a variety of computing devices such as a laptop, PDA, cell phone, or MP3 player. The media client 301 is able to display the media 302 that is available to a remote media server 200 and allows the user to select and play the selected media on the remote media server 200.

For example, the media client 301 may be a web browser-based media client and the media server 200 may be a web-based media server. The user may select the media to be played by browsing the media 302 contents through the media server 200 and then selecting the media to be played.

The media 302 played by the media server 200 may be local to the source device 101 as shown in FIG. 3, or it may reside on yet another device on a network accessible by the media server 200. In an alternate embodiment, the media server 200 and the media 302 may reside on one of the media renderers 203 in the zone.

As shown in FIG. 3, the media 302 from the media server 200 is streamed to media renderers 203 through a media bridge 211. The media bridge 211 comprises a bridge renderer 205 and a distribution server 204. The role of the bridge renderer 205 and distribution server 204 is to transform a standard media stream and protocol 202 from any media server 200 into a stream format 208 appropriate for the media renderers 203. The media server 200 uses any media transport that transports audio to a bridge renderer 205. The bridge renderer 205 will receive the media stream 202 from the media server 200 and provide it to a distribution server 204. The distribution server 204 will transform the input media stream 215 into a stream protocol format appropriate for the media renderers 203 and distribute the formatted stream 208 to one or more media renderers 203. In addition, the distribution server 204 transforms the stream from the media server 200 from being a single source to a single destination stream to a single source to multiple destination streams.

In one implementation, all streams and connections are established by a regular control point 201 that is part of a zone control point 209. In another implementation, if only a standard control point 201 is being used, the control point 201 will find out during device query the presence of all devices in the network. However, the control point 201 will find that the media renderers 203 will only accept a special stream format, and that only the bridge renderer 205 will accept formats that a typical media server 200 can generate. The control point 201 will therefore only be able to connect media from the media server 200 to the bridge renderer 205.

The bridge renderer 205 will only be available if a zone control point 209 has already registered a zone and enabled the bridge renderer 205. The enabled bridge renderer 205 will provide information to inform the control point 201 and in some cases the user that it is able to pass on the media stream 202 to the media renderers 203. Thus, the control point 201 and user will know that streaming to the bridge renderer 205 is all that is necessary for streaming to the media renderers 203.

In an extension of the same system, it is possible to have multiple distribution servers 204 streaming the same media 202 to multiple sets of media renderers 203, where each set of media renderers is in a different zone. In yet another configuration, the media server may stream multiple streams 202, to multiple media bridges 211, where each bridge is streaming the media to a different set of media renderers. The media server 200, may be serving a song to one zone, while playing an announcement to another zone.

5.2 Local Source to Audio Device (LSAD)

Media Playback on a Local Device

FIG. 4 illustrates a system configuration for media playback on a local device. This configuration would be used, for example, when a user wishes to play media on a local computing device using any media player application. In this configuration, the playback (streaming) of the media is performed on the source device 101 that is local to the user. The system comprises a media source device 101 and multiple destination devices 103. A wireless access point 102 may also be present, though not shown here. Each of the devices in the system contains the services shown in FIG. 4.

As shown in FIG. 4, the media 401 is located on the source device 101 and is played via a media player 207 also on the source device 101. The media player 207 is a typical media application that plays to a local device installed in the local system through a device driver. In such a system, a virtual audio device driver 206 is also installed, which will provide the media player 207 with a primary or alternate 'virtual' local device to which to play. The virtual audio device driver 206 will intercept and route the media stream 202 from the media player 207 to the distribution server 204. The distribution server 204 will distribute the stream 208 to each media renderer 203.

A media player 207 may be viewed as one application that provides the functionality of the media server 200, media renderer 203, and control point 201 as described with regard to other embodiments herein.

In addition, the source 101 also contains a zone control point 209. The zone control point 209 detects the media renderers 203, either directly or via a zone manager 210 if present, and configures the virtual audio device driver 206 and media renderers 203 appropriately.

This configuration can be used with a variety of source devices 101 such as laptops, PDAs, cell phones, MP3 players, PCs, media center PCs, cable or satellite set-top boxes or game players such as a PlayStation™ (PlayStation is a trademark of Sony Computer Entertainment America Inc.) or XBOX™ (XBOX is a trademark of Microsoft Corp.).

In these cases, software with the functionality for the zone control point 209, virtual audio device 206, and distribution server 204 is installed on these source devices 101, and then this software will route any audio played by any software on these source devices 101 to the media renderers 203.

5.3 Remote Source to Audio Device (RSAD)

Media Playback on a Remote Device

FIG. 5 shows another system configuration for media playback on a local device. It is similar to the RSBR configuration in FIG. 3, except that the bridge renderer 205 of FIG. 3 is replaced with the virtual audio device 206 within the media bridge 211. This configuration is for the case where the media server 200 is an application that plays to a local audio device. In this case, the virtual audio device 206 is installed on the source device 101, together with the distribution server 204.

6. Application Examples 6.1 Example 1

Follow Me Music from PDA

In this example, a family has wireless IP addressable speakers (media renderers) installed in their two cars and in their living room and bedroom. The system is a 'Local Source to Audio Device (LSAD)' Configuration as shown in FIG. 4.

Each of two users has a wireless PDA as a source device 101 with a media player 207, zone control point 209, virtual audio device 206 and distribution server 204 on it. This software package was downloaded automatically onto the PDA from a web site. Each PDA's zone control points 209 are configured with source identifiers 1 and 2, and configured to play in zones Car1, Car2, Living Room and Bedroom. Each of the two source devices 101 are configured with the public keys for the speakers in Car1, Car2, Living Room and Bedroom. Each zone has a zone manager 210 that has registered and authenticated with the speakers in its physical zone.

When User1 gets into Car1 with PDA1, the zone control point on the PDA will discover the zone manager 210 in Car1 and retrieve zone information. The zone control point 209 will then request registration to the zone speakers. The zone manager 210 will approve the registration and then register and lock the speakers for use by this zone control point 209, and the zone control point 209 will connect the media player 207 through to the speakers. When User1 selects a song on his media player 207 on PDA1 to play, the music will stream to and play on the Car1 speakers. Subsequent song selections will play the same way.

When User1 gets out of the car and goes into the living room, the zone control point 209 on PDA1 will detect that it is going out of range of the Car1 zone manager 210 and that it is now in the vicinity of (closer range) the Living Room zone manager 210. The zone control point 209 will now pause streaming, deregister from the Car1 zone, register with the Living Room zone, re-route the stream to the Living Room speakers and resume streaming. This process causes the music that was playing from PDA1 to the Car1 speakers to follow the user into the living room and now continue playing on the Living Room speakers.

In an extension of this application, a different control point 201 may initiate the stream of a media segment to wherever the user is located. For example a receptionist in an office may play an announcement in the vicinity of an executive. In such an application, the receptionist has an application program that includes a zone control point 209. This application queries one or more zone managers 210 for the location of the executive's zone control point 209 and then routes a media stream to the media renderers 203 in the vicinity of that executive.

Alternatively, the receptionist may cause media to be streamed to a specific zone, such as the cafeteria zone or many zones. For example, an all-zone stream may be created for emergency messages.

In addition there may be a server application that contains a zone control point. The server application can use the zone control point to stream media messages sent to it by email on one or more zones.

This example is also applicable to hotels and restaurants where the music follows the user, or offices and campuses where audio messages follow the user. The source media for the stream may be from a pre-recorded media segment or from a stream generated in real time via a speaker.

6.1.1 Follow Me Music from Server

When in the home, in an alternative configuration, the zone control point 209 goes through the same process as above to define the zone and speakers to which the audio stream should be sent. However, at the point of playback, the media source selected may be a source present at another location.

For example, the zone control point 209 may be on a PDA on the body of the user in a home that has many wireless speakers and one media server 200 and media bridge 211 located in the house. As the user moves around the house from room to room and zone to zone, the zone control point 209 on the PDA keeps selecting the a new zone (e.g., the closest zone) and set of speakers to render to and instructs the media server 200 to render to this new zone. In this way, the media source 101 is only located at one fixed point, but the music rendition moves from room to room with the user and zone control point 209.

In Example 1 above, the media server 200 and media bridge 211 may be located in the Car1 zone and detected by the control point 201 or zone control point 209 as the it queries for media servers 200 during the discovery process.

6.2 Example 2

Coffee Shop: Play for a Quarter

In this example, a coffee shop may be installed with wireless speakers where the customers are allowed to play music from their music cell phones for a quarter. The coffee shop has a 'Remote Source to Bridge Renderer (RSBR)' configuration as shown in FIG. 3, where the destination devices 103 are the wireless speakers in the shop, the source device 101 is a server computer located in and owned by the coffee shop and the customer cell phones are the client devices 106. If the customers do not have the necessary software installed on their cell phone, they may download it from the coffee shop web site.

When a customer walks in, the zone control point 209 on her cell phones discovers the zone manager for the coffee shop and gathers zone information including the music media available and the billing method and amounts. Choosing to browse the coffee shop media may require media server 200 access authorization and may include a charge. The media client 301 may shows advertisements to the user during browsing, and these ads may pay for some of the cost of this system. Once the user selects the music to play and initiates play, a connection to the speakers will be attempted as described above. This may involve an automatic charge as described above that the user will be accepting either by initiating the play or by a further prompt.

The coffee shop may also allow the customer to play his own music on his cell phone. In this case the software downloaded on to the cell phone is for configuration 'Local Source to Audio Device (LSAD)', show in FIG. 4. Again the zone control point 209 on the cell phone discovers the zone manager 210 and sets up the connection from the distribution server 204 to the media renderers 203. Each step may require authorization by the coffee shop and the user may incur a charge for playback.

6.3 Example 3

Media Booth: Location-Driven Playback

In this example, as the user enters a playback zone, such as a retail booth, the user's mobile device causes the wireless speakers in the retail booth to play media to the user. The media may be generic or user-specific and playback may include playback to a video display as well.

In this embodiment, the mobile device has a zone control point 209 as described above, while the booth has the wireless speakers and zone manager 210. A media server 200 is also present on the zone manager network, but may not be physically in the booth.

When the user enters the vicinity of the zone, the zone control point 209 detects the zone manager 210 and interacts with it. Entering a play zone is detected by monitoring signal strength of the communication between the zone control point 209 on the mobile device and the zone manager 210 in the booth. If the zone manager 210 detects an appropriate zone control point 209, and the zone control point 209 is configured for auto playback, the zone control point 209 will, upon detecting the zone manager 210, register with the zone and then connect the media server 200 to play media through to the speakers.

The zone manager 210 may provide the zone control point 209 with an auto play list and information on the media server to cause automatic playback. In addition the zone manager 210 may provide the zone control point 209 with information and selection prompts for the user to make based on the media available from the zone. So, if the booth is related to a particular product category, the user will automatically be provided with general background information and then may be asked to select from a number of categories for more detailed information. This selection will cause that selection to be streamed from the media server 200 to the speakers. In addition, the zone control point 209 may direct the video portion of the media to be streamed to a video device.

In a related example, a system similar to this can be used for a system such as an exercise machine, where the machine has a zone manager 210 and media renderers 203 and these would render media depending on the user and the user's mobile device with a zone control point 209.

In another related example, another system can be implemented for grocery store aisles that have media renderers 203 and that play media based on shoppers that have mobile devices with a zone control point 209 on them.

The present invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of methods and symbolic representations of operations on information. These descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein.

The present invention is well suited to a wide variety of computer network systems over numerous topologies. Within this field, the configuration and management of large networks comprise storage devices and computers that are communicatively coupled to dissimilar computers and storage devices over a network, such as the Internet, public networks, private networks, or other networks enabling communication between computing systems.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A system for reproducing a media, the system comprising:
   a plurality of media renderers, each media renderer connected to a wireless network and assigned to one or more zones;
   a mobile media device operably communicating with the media renderers via the wireless network, the mobile media device comprising:
   a repository for storing media;
   a zone manager configured to the receive responses from the media renderers responsive to broadcasting messages periodically to the media renderers by the zone manager, the responses indicating presence and states of the media renderers, the zone manager further configured to track communication signal strength information indicating strength of wireless signals to and from the media renderers; and a control point configured to:
 interact with the zone manager to identify media renderers assigned to a zone based on the responses collected by the zone manager,
 select and reserve media renderers within the zone for rendering a media stream corresponding to the stored media,
 receive communication signal strength information from the zone manager, and
 select another zone assigned with at least one media renderer compared to the zone responsive to communication signal strength from a media renderer in the zone being below a threshold.

2. The system of claim 1, wherein the plurality of media renderers comprise a first set of media renders closer to a first location compared to a second location and a second set of media renderers close to the second location compared to the first location, wherein the media stream is rendered in the first set of media renderers responsive to the mobile media device closer to the first location than the second location, and the media stream is rendered in the second set of media renderers responsive to the mobile media device closer to the second location than the first location.

3. The system of claim 2, wherein proximity of mobile media device to the first location or the second location is determined based on strength of wireless signal transmitted by the media renderers.

4. The system of claim 1, wherein the zone manager is configured to broadcast the messages with a predetermined time interval or a variable time interval.

5. The system of claim 1, wherein the selection of media renderers by the mobile media device reserves the selected media renderers for use by the mobile media device until the selected media renderers are released by the mobile media device.

6. The system of claim 1, wherein the mobile media device is configured to release the reserved media renderers responsive to detecting subsequent reservation for the media renderers by another mobile media device.

7. The system of claim 1, wherein the reservation of the media renderers by the mobile media device is canceled and made available for subsequent reservation and use by another mobile media device.

8. The system of claim 1, further comprising a plurality of zone managers installed other than on the mobile media device, wherein the control point selects a zone based at least in part on signal strength of communications between the control point and the plurality of zone managers.

9. The system of claim 1, further comprising a means for a zone manager to authenticate requests from a control point.

10. The system of claim 1, wherein the media stream is streamed from a media source comprising a media player, and wherein a virtual audio device driver intercepts the media being played by the media player and streams the media to the plurality of media renderers.

11. The system of claim 1, where the media renderer provides information comprising speaker volume or role that the control point displays to a user, wherein the role comprises one selected from a group consisting of front left, front right, front center, back left, back right, back center, and subwoofer.

12. The system of claim 1, wherein the zone manager provides information regarding the zone to the control point, the information comprising physical location and zone ownership information, and wherein the control point displays the information to a user.

13. The system of claim 1, wherein at least one of the plurality of media renderers is assigned to more than one zone.

14. The system of claim 1, wherein the control point displays zone information to a user of the control point.

15. The system of claim 1, wherein the control point causes a pre-recorded or real time media to be streamed to at least one zone.

16. A method of reproducing a media by a mobile media device, comprising:
 storing media in the mobile media device;
 assigning each of a plurality of media renders to one or more zones;
 broadcasting messages to the plurality of media renderers periodically via a wireless network;
 receiving responses from at least a subset of the plurality of media renderers via the wireless network responsive to broadcasting the messages, the responses indicating presence and states of the media renderers;
 tracking communication signal strength information indicating strength of wireless signals to and from the plurality of media renderers;
 reserving media renders in a zone for rendering a media stream sent by the mobile media device based on the received responses;
 sending a media stream corresponding to the stored media to the reserved media renderers; and
 selecting media renderers in another zone for rendering the media stream responsive to communication signal strength from media renderers in the zone being below a threshold.

17. The method of claim 16, further comprising:
 displaying, on the mobile media device, information about media available for playback using the plurality of media renderers; and
 responsive to receiving an input selecting media for playback, causing at least a subset of the media renderers to receive and play media stream corresponding to the selected media.

18. The method of claim 17, further comprising charging a user a price for playing back the selected media.

19. The method of claim 16, wherein the messages are broadcasted with a predetermined time interval or a variable time interval.

20. The method of claim 16, further comprising releasing the reserved media renderers for use by another mobile media device.

21. The method of claim 16, further comprising releasing the reserved media renderers responsive to detecting subsequent reservation for the media renderers by another mobile media device.

22. The method of claim 16, further comprising displaying to a user speaker volume or role of each media renderer.

23. The method of claim 16, further comprising:
 determining whether the mobile media device is closer to a first location or a second location;
 sending the media stream to a first set of media renderers closer to the first location compared to the second location responsive to the mobile media device closer to the first location; and
 sending the media stream to a second set of media renderers closer to the second location compared to the first location responsive to the mobile media device closer to the second location.

24. A mobile media device, comprising:
- a communication module configured to operably communicate with a plurality of media renderers via a wireless network, each media renderer assigned to one or more zones;
- a repository for storing media;
- a zone manager configured to receive responses from the media renderers responsive to broadcasting messages periodically to the media renderers by the zone manager, the responses indicating presence and states of the media renderers, the zone manager further configured to track communication signal strength information indicating strength of wireless signals to and from the media renderers; and
- a control point configured to
    - interact with the zone manager to identify media renderers assigned to a zone based on the responses collected by the zone manager,
    - select and reserve media renderers within the zone for rendering a media stream corresponding to the stored media,
    - receive communication signal strength information from the zone manager, and
    - select another zone responsive to a communication signal strength from a media renderer in the zone being below a threshold.

25. The mobile media device of claim 24, wherein the plurality of media renderers comprise a first set of media renderers closer to a first location compared to a second location and a second set of media renderers close to the second location compared to the first location, wherein the media stream is rendered in the first set of media renderers responsive to the mobile media device closer to the first location than the second location, and the media stream is rendered in the second set of media renderers responsive to the mobile media device closer to the second location than the first location.

26. The mobile media device of claim 25, wherein proximity of mobile media device to the first location or the second location is determined based on strength of wireless signal transmitted by the media renderers.

27. The mobile media device of claim 24, wherein the zone manager is configured to broadcast the messages with a predetermined time interval or a variable time interval.

28. The mobile media device of claim 24, where the media renderer provides information comprising speaker volume or role that the control point displays to a user, wherein the role comprises one selected from a group consisting of front left, front right, front center, back left, back right, back center, and subwoofer.

29. The mobile media device of claim 24, wherein the zone manager provides information regarding the zone to the control point, the information comprising physical location and zone ownership information, and wherein the control point displays the information to a user.

* * * * *

UNITED STATES PATENT AND TRADEMARK OFFICE
CERTIFICATE OF CORRECTION

PATENT NO. : 8,239,559 B2
APPLICATION NO. : 11/777935
DATED : August 7, 2012
INVENTOR(S) : Ravi Rajapakse It is certified that error appears in the above-identified patent and that said Letters Patent is hereby corrected as shown below:

In claim 24, column 23, line 15, after "a control point configured to," insert --:--.

Signed and Sealed this
Eighteenth Day of December, 2012

David J. Kappos
*Director of the United States Patent and Trademark Office*